Patented Feb. 14, 1928.

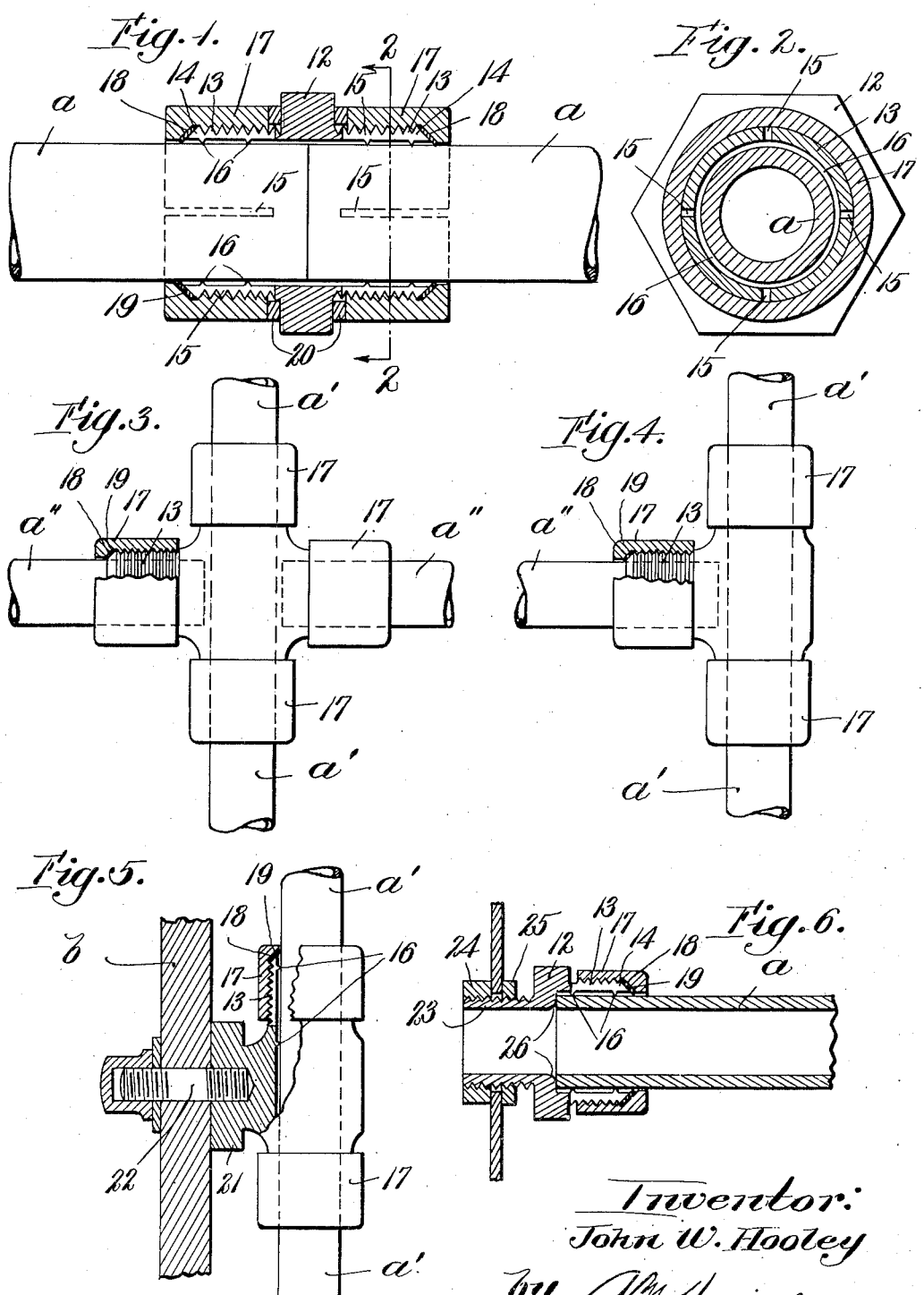

1,659,268

UNITED STATES PATENT OFFICE.

JOHN W. HOOLEY, OF LARCHMONT, NEW YORK.

JOINT FOR SCREWLESS PIPES OR CONDUITS.

Application filed November 3, 1926. Serial No. 145,952.

This invention relates to means for connecting cylindrical articles such as pipes, conduits or rods, either by coupling them together end to end or to other objects, and the invention has particular reference to means for effecting a tight joint without providing the pipes, conduits or rods with any screw threads. For the sake of brevity and not for limitation, the threadless cylindrical articles will be hereinafter referred to as conduits because the invention is especially useful in connection with the installation of electric wires.

It is frequently desirable, especially in the installation of conduits for electric wiring, to mount or secure the conduits in position without requiring that any rotative or longitudinal movement shall be imparted to them when they are joined to other conduits or to other fittings. Therefore one of the objects of the invention is to provide a joint which effects a secure grip on a conduit which is externally smooth or has no screw threads, the coupling to another conduit or to a supporting fitting being effected without imparting any movement to the conduit.

Another object is to provide a joint or coupling of the character just referred to, by means of which a direct and smooth passageway for wires through an opening in a plate or wall of a box or casing, can be easily provided.

With the above objects in view, the invention consists in the construction and combination of parts substantially as hereinafter described and claimed.

Of the accompanying drawings:

Figure 1 is a longitudinal sectional view of one form of my improved joint or coupling.

Figure 2 represents a section on line 2—2 of Figure 1.

Figures 3 and 4 represent the invention as applied to a crossing and to a T, respectively.

Figure 5 represents the invention as applied to a panel board support.

Figure 6 is a sectional view of another form of the coupling as applied to the connection with a plate or wall of a box.

Similar reference characters indicate similar parts or features in all of the views.

Referring first to Figures 1 and 2, two conduit sections $a$, $a$, which may be galvanized or painted but have no screw threads and consequently present no fresh-cut surfaces for the action of acids, alkalis, atmospheric or other deleterious substances, are joined end to end by my improved coupling comprising a sleeve having a mid-length portion 12 suitably shaped externally to be engaged by a tool such as a wrench, and externally threaded contractile portions 13 having their outer end edges bevelled or tapered as indicated at 14. The portions 13 are longitudinally slitted or slotted as at 15. In Figure 2 I illustrate four of such slots, but there may be any required number.

The threaded peripheries of the portions 13 are of uniform diameter, and said portions are formed or provided with internal ribs or projections 16 to bite into the surfaces of the conduits $a$, $a$, as hereinafter described.

Fitting the threads of each portion 13 is a sleeve or collar 17 the outer end of which is formed with an internal bevelled or inclined surface 18 to coact as a cam with the bevelled end 14 of the portion 13, when the sleeve 17 is screwed home, to contract the segmental portions between the slots 15 and cause the ribs or projections 16 to bite into the surface of the conduit $a$.

Preferably thin washers or gaskets 19, of ductile metal such as copper, are interposed between the inclined surfaces 14, 18. And for some uses it is desirable that packing shall be employed between the inner ends of the sleeves 17 and the sides of the portion 12 of the coupling, as indicated at 20.

Figures 3, 4 and 5, represent embodiments of my invention for uses other than coupling two conduits directly end to end. Figure 3 illustrates one conduit $a'$ as passing entirely through a coupling member having four arms or branches each of which has a contractile threaded portion 13 and a sleeve or collar 17 similar to the members having those reference characters in Figures 1 and 2. Conduit sections $a''$ are gripped in the two lateral branches, while the conduit $a'$ is gripped by the upper and lower branches.

Figure 4 illustrates a similar structure but having only one lateral branch.

In the structure illustrated by Figure 5, the coupling has a lateral foot piece 21 provided with a threaded socket for a bolt 22 by means of which the coupling and its gripped conduits, or two conduits gripped end to end, may be secured to a slab or wall member $b$.

Obviously, and without need of illustration, the coupling may be adapted for other uses. For instance, a joint device or coupling such as illustrated by Figure 1 may be formed like a reducing coupling to join conduit sections one of which is larger than the other. Or the coupling may be part of a member which may be supported by a floor and grip a conduit or its equivalent in upright position.

Referring now to Figure 6 which illustrates an important embodiment of my invention, the joint or coupling is shown as connecting a conduit *a* to a plate or wall *c* of a box, the portions indicated at 12, 13, 14, 16, 17, 18 and 19 being the same in structure and function as the similarly indicated portions in Figure 1. In said Figure 6, the portion 13 which is slotted in one direction from the portion 12 has an integral portion 23 which is of lesser diameter than the contractile portion 13 so as to substantially accord with the diameter of the conduit *a*. In other words, the internal diameter of the portion 13 which grips the conduit *a* is substantially the same as the external diameter of the smaller portion 23 which is adapted to be passed through an opening in a plate or wall *c* and securely held therein by lock nuts or bushings 24, 25. The inner end of the portion 23 forms a shoulder against which the end of the conduit section *a* abuts, and said shoulder is rounded so that when wires are pushed or drawn through the conduit and the coupling, there will be no sharp edges to injure the wires or the insulation thereof.

A particular advantage possessed by the structure just described is that the wires can be drawn through a conduit and through an opening in a plate, or box, or wall, without being injured by contact with any edge portions of the opening. In other words, the portion 23 provides a smooth continuation of the interior of the conduit, for the wiring, while the portion 13, with its cooperating contracting sleeve or collar 17, serves to firmly grip the end of the conduit and maintain it in its position of alinement with the portion 23. This provides a structure which enables a conduit to be connected to the opening in the wall, without employing a threaded conduit as has been the practice, which threaded conduit was passed into the opening and secured by nuts.

In each form illustrated, the sleeves or collars 17 may have any suitable external form to enable them to be turned with sufficient force to cause their cam surfaces 18 to act on the bevelled ends of the members 13 to press the internal projections of the latter tightly against the un-threaded ends of the conduits. And while the internal projections 16 are indicated in the drawings as in the form of ribs, it is to be understood that they may be in the form of pointed studs.

I do not claim herein the specific coupling illustrated by Figures 1 and 2, as the same forms the subject matter of my application Serial No. 226,020, filed October 13, 1927.

Having now described my invention, I claim:—

1. A joint for gripping a conduit, comprising a one-piece longitudinally slitted member having external threads of uniform diameter and having internal projections and a bevelled end, and an internally threaded sleeve having an internally bevelled portion to coact with the bevelled end of the slitted member in effecting a gripping action of the latter on a conduit, a ductile metal washer being interposed between the bevelled portions of the sleeve and slitted member.

2. A coupling for uniting a conduit to an apertured portion of a wall, comprising a tubular member having oppositely projecting portions of different diameters both of which are externally threaded and the larger one being longitudinally slitted, and an internally threaded sleeve fitting the slitted portion of the tubular member and formed to contract said slitted portion on a conduit, the internal diameter of the larger projecting portion being substantially the same as the external diameter of the smaller portion.

3. A coupling for uniting a conduit to an apertured portion of a wall, comprising a tubular member having a longitudinally slitted externally threaded portion the end of which is bevelled and having another externally threaded portion projecting in the opposite direction from the slitted portion and of lesser diameter than said slitted portion, and an internally threaded sleeve having an internally bevelled portion to coact with the bevelled end of the slitted portion in effecting a gripping action of the latter on a conduit, the internal diameter of the said slitted portion being substantially the same as the external diameter of the smaller oppositely projecting portion.

In testimony whereof I have affixed my signature.

JOHN W. HOOLEY.